(12) United States Patent  
Kakkar et al.

(10) Patent No.: US 11,150,396 B2  
(45) Date of Patent: Oct. 19, 2021

(54) MOLDED LIGHT GUIDE FOR OPTICALLY COUPLING LIGHT FROM LEDS

(71) Applicant: Lumileds LLC, San Jose, CA (US)

(72) Inventors: Varun Dev Kakkar, Eindhoven (NL); Erno Fancsali, Eindhoven (NL); Frans Hubert Konijn, Huizen (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/098,847

(22) PCT Filed: Nov. 8, 2016

(86) PCT No.: PCT/EP2016/076993  
§ 371 (c)(1),  
(2) Date: Nov. 2, 2018

(87) PCT Pub. No.: WO2017/190813  
PCT Pub. Date: Nov. 9, 2017

(65) Prior Publication Data  
US 2019/0146142 A1  May 16, 2019

Related U.S. Application Data

(60) Provisional application No. 62/331,741, filed on May 4, 2016.

(51) Int. Cl.  
*F21V 8/00* (2006.01)

(52) U.S. Cl.  
CPC .......... *G02B 6/0021* (2013.01); *G02B 6/0055* (2013.01); *G02B 6/0065* (2013.01); *G02B 6/0073* (2013.01); *G02B 6/0083* (2013.01)

(58) Field of Classification Search  
CPC .... G02B 6/0016; G02B 6/0018; G02B 6/002; G02B 6/0021  
See application file for complete search history.

(56) References Cited

U.S. PATENT DOCUMENTS 7,334,933 B1 * 2/2008 Simon .............. F21V 7/0091  
362/328  
8,602,621 B2  12/2013 Li et al.  
(Continued)

FOREIGN PATENT DOCUMENTS

CN  1288384 C  12/2006  
CN  101206280 A  6/2008  
(Continued)

OTHER PUBLICATIONS

"International Application Serial No. PCT/EP2016/076993, International Preliminary Report on Patentability dated Nov. 15, 2018", 7 pgs.  
"International Application Serial No. PCT/EP2016/076993, International Search Report dated Feb. 10, 2017", 3 pgs.  
"International Application Serial No. PCT/EP2016/076993, Written Opinion dated Feb. 10, 2017", 5 pgs.  
(Continued)

*Primary Examiner* — Keith G. Delahoussaye  
(74) *Attorney, Agent, or Firm* — Schwegman Lundberg & Woessner, P.A.

(57) ABSTRACT

A thin plastic light guide is formed to have cavities on one surface and TIR (total internal reflection) structures directly above the cavities. LEDs mounted on a printed circuit board are positioned in the cavities. The cavity walls are shaped to refract the LED light and direct the LED light toward the TIR structures to most efficiently make use of the TIR structures. The TIR structures may have a cusp or cone shape. The top ceiling of the cavities may be shaped to direct light at the TIR structure so as to leak through the TIR structure and blend the light with light leaking through surrounding portions of the light guide. The LEDs may be distributed only near the edges of the light guide or over the entire back surface of the light guide. A diffuser sheet may be laminated over the light guide to further mix the light.

11 Claims, 2 Drawing Sheets

(56) References Cited

U.S. PATENT DOCUMENTS

| | | | |
|---|---|---|---|
| 9,075,172 | B2 | 7/2015 | Koh et al. |
| 2011/0090672 | A1 | 4/2011 | Zhu et al. |
| 2011/0204921 | A1 | 10/2011 | Cheong et al. |
| 2011/0249214 | A1 | 10/2011 | Cheong et al. |
| 2012/0069575 | A1 | 3/2012 | Koh et al. |
| 2012/0069579 | A1* | 3/2012 | Koh .................. G02B 6/0021 362/307 |
| 2013/0088857 | A1* | 4/2013 | Lee .................. G02B 19/0047 362/97.1 |
| 2015/0346413 | A1* | 12/2015 | Kadoriku ............ G02B 6/0016 362/613 |

FOREIGN PATENT DOCUMENTS

| | | | |
|---|---|---|---|
| CN | 102272511 | A | 12/2011 |
| CN | 102282416 | A | 12/2011 |
| CN | 103443664 | A | 12/2013 |
| CN | 104748067 | A | 7/2015 |
| CN | 109312906 | A | 2/2019 |
| EP | 3452755 | A1 | 3/2019 |
| JP | 2001305257 | A | 10/2001 |
| JP | 2009021086 | A | 1/2009 |
| KR | 101484466 | B1 | 1/2015 |
| TW | I418894 | B | 12/2013 |
| WO | WO-2017190813 | A1 | 11/2017 |

OTHER PUBLICATIONS

"Chinese Application Serial No. 201680085346.6, Office Action dated Feb. 19, 2020", (w/ English Translation), 17 pgs.

"Chinese Application Serial No. 201680085346.6, Response filed Jul. 2, 2020 to Office Action dated Feb. 19, 2020", (w/ English Translation), 9 pgs.

"European Application Serial No. 16794992.4, Communication pursuant to Article 94(3) EPC dated Mar. 1, 2019", 4 pgs.

"European Application Serial No. 16794992.4, Communication Pursuant to Article 94(3) EPC dated Oct. 16, 2020", 4 pgs.

"European Application Serial No. 16794992.4, Response filed Jun. 17, 2019 to Office Action dated Mar. 1, 2019", 25 pgs.

"Chinese Application Serial No. 201680085346.3, Office Action dated Oct. 27, 2020", (w/ English Translation), 17 pgs.

"Chinese Application Serial No. 201680085346.3, Response filed Dec. 31, 2020 to Office Action dated Oct. 27, 2020", (w/English Translation), 21 pgs.

"European Application Serial No. 16794992.4, Response filed Feb. 9, 2021 to Communication Pursuant to Article 94(3) EPC dated Oct. 19, 2020", 25 pgs.

"Chinese Application Serial No. 201680085346.3, Office Action dated Jan. 20, 2021", 20 pgs.

"U.S. Appl. No. 17/071,294, Non Final Office Action dated May 17, 2021", 20 pgs.

\* cited by examiner

MOLDED LIGHT GUIDE FOR OPTICALLY COUPLING LIGHT FROM LEDS

FIELD OF THE INVENTION

This invention relates to a lighting structure comprising a light guide mixing and emitting the light from light emitting diodes (LEDs) and, in particular, to forming structures in the light guide to optically couple the LED light and spread the light. The structure may be used for backlighting, general lighting or for other applications.

BACKGROUND

It is known to optically couple LED light into the side edges of a transparent light guide. A surface of the light guide has optical features, such as prisms or roughening, to allow the light to uniformly leak out. Since the LEDs have a Lambertian emission, it is difficult to couple into the edge of the light guide. Further, the light guide must be relatively thick to enable the edges to receive the light from the LEDs.

It is also known to form holes through the light guide around its perimeter and position an LED at the bottom of each hole. An opaque reflector layer is then positioned over the top opening of each hole to reflect any top emission from the LED back into the light guide. The reflector layer is typically a metallized plastic film. US patent application publication US 20080049445 describes a light guide with an LED positioned at the bottom of a hole with an opaque cusp-shaped reflector overlying each hole to reflect the light sideways into the light guide. The light is further mixed in the light guide. Such reflectors create dark spots over the LEDs and are difficult to precisely align with the LEDs. An opaque bezel must be positioned over the LEDs so the dark spots are not visible. Further, the reflector may only have a reflectivity of about 85-90%, so there is significant attenuation of light rays reflected off the reflective layer. Other disadvantages exist.

Additionally, since the LEDs are only positioned along the perimeter of the light guide, it is difficult to uniformly leak light out across the top surface area of the light guide not covered by the bezel.

US 2011/0249214 A1 discloses a backlight assembly with light sources positioned in cavities of a light guide. The light guide comprises TIR structures above the cavities. Due to total internal reflection, the light generated by the light sources is reflected into the light guide, creating dark spots over the light sources.

What is needed is a lighting structure that uses a light guide and LEDs, where the structure does not suffer from the drawbacks of the prior art.

SUMMARY

In one embodiment, a thin plastic light guide is formed to have cavities on one surface and TIR (total internal reflection) structures directly (can be off-centered also) above the cavities. A through-hole is not formed. LEDs mounted on a printed circuit board (including a flexible circuit) are positioned in the cavities. The LEDs may be grouped, for instance in one or more arrays. The LEDs may have a Lambertian emission and no lens, so are very thin. At least the top ceiling of each cavity is shaped to direct the LED light to most efficiently make use of the TIR structures. For example, the TIR structures may have a cusp shape, and the top ceiling of the cavities may reflect the LED light to optimally impinge on the TIR structure to maximize the TIR and the mixing of light. Further, the TIR structures and cavities may be shaped to cause a controlled amount of light to leak out through the TIR structures so there are no dark spots and no need for a bezel. Depending on the configuration and function of the light guide the leakage through the TIR may be zero or small compared to the amount of light reflected by the TIR structure.

The TIR structures and cavities may be symmetrical or asymmetrical. An asymmetrical shape takes into account that the LEDs along a perimeter should have more of their light directed toward the middle of the light guide. This technique can also be used to shape the beam or making asymmetric light beam. The cavities may for instance be roughened, coated, filled with material and/or partly reflective to support directing the light to the TIR structure.

The bottom or top surface of the light guide has additional optical features, such as tiny prisms, dots, or roughening, to cause the uniform leaking of light through the top surface. The optical features may vary along the surface to leak out different percentages of the light to improve uniformity across the light guide.

As mentioned above, the TIR structures and cavities may be formed to leak out a controlled amount of light so there are no dark spot over the LEDs. The light leaking through the TIR structure may be the same brightness as the light leaking out other areas of the light guide surface. This allows the LEDs to be distributed over the entire bottom surface of the light guide, which improves uniformity and enables the light guide to be any size and shape.

By molding the TIR structures in the light guide along with the cavities, the TIR structures and cavities can be precisely aligned. The light guide can possibly be very thin, even such as less than 3 mm, and flexible.

A diffuser sheet or other type of sheet may be laminated over the light guide to further mix the light for increased uniformity or perform another function. A reflective film may be laminated with or without airgap on the bottom surface of the light guide and its edges to ensure all light exits the top surface of the light guide.

Other embodiments are disclosed.

BRIEF DESCRIPTION OF THE DRAWINGS

Elements that are the same or similar are labeled with the same numeral.

DETAILED DESCRIPTION

Figure 1:
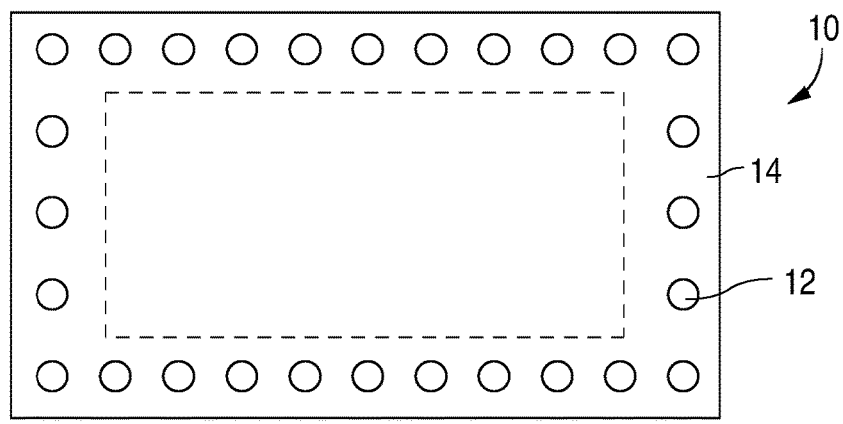
FIG. 1 is a top down view of a light guide, in accordance with one embodiment of the invention, showing areas where LED cavities and TIR structures are located around the perimeter. The relative size of each area is greatly enlarged for clarity.

FIG. 1 illustrates a light guide 10 in accordance with one embodiment of the invention. The light guide 10 may be PMMA, PET, or other plastic having a thickness on the order of for instance 2-5 mm. The light guide 10 may be flexible.

Figure 4:
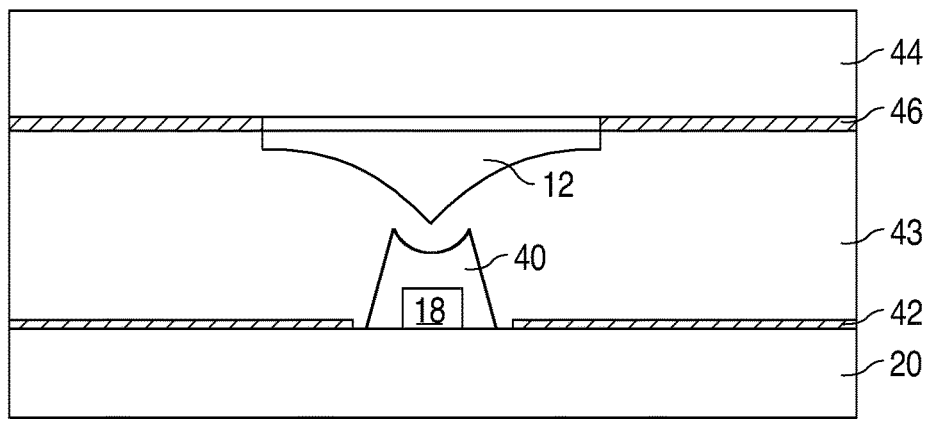
FIG. 4 is a bisected view of another single cavity and TIR structure (a cusp shape), where a diffusion sheet or other type of sheet is laminated over the light guide, and a reflector sheet is positioned below the light guide.

The light guide 10 is molded, such as by pressing between two opposing heated rollers or plates having a negative of the molded features, to form top TIR structures 12 and bottom cavities 40 (FIG. 4). An LED 18 (FIG. 4) is positioned in each cavity 40. The TIR structures 12 and cavities 40 are precisely aligned due to the alignment of the molding rollers/plates. The TIR structures 12 and cavities are formed along one or more edges of the light guide 10 and are accordingly in this embodiment off centered in the light guide. Also asymmetrical and off-centered configurations of TIR structures and cavities with respect to the light guide are possible. For a small light guide 10, only one TIR structure/cavity may be required along only one edge. For a much larger light guide 10, the TIR structures 12 and cavities may be located along all four edges or distributed over the entire surface. The pitch of the TIR structures 12 and cavities depends on the number of LEDs needed for a desired brightness and the size of the light guide. Typical for this off centered configuration of FIG. 1, the leakage through the TIR may be zero or small compared to the amount of light reflected by the TIR structure.

Instead of molding the light guide and/or the cavities and/or the TIR structures, one or more of techniques of injection molding, hot pressing, machining, 3D printing, rolling, laser treatment and other manufacturing options may be used to create the light guide.

The LEDs may be grouped, for instance in one or more arrays, and may have same or different colors, for instance for color tuning, more in particular for generating white light. In particular also neighboring LEDs may have different colors. (Multiple LEDs of same or different colors can also be used under one cavity as another type of solution).

In one embodiment, an opaque bezel 14, shown transparent with an opening defined by the dashed-line rectangle, overlies the TIR structures 12 if there are dark spots or bright spots to be hidden. The bezel 14 may be part of a frame that supports the light guide 10 or may be part of a housing.

Figure 2:
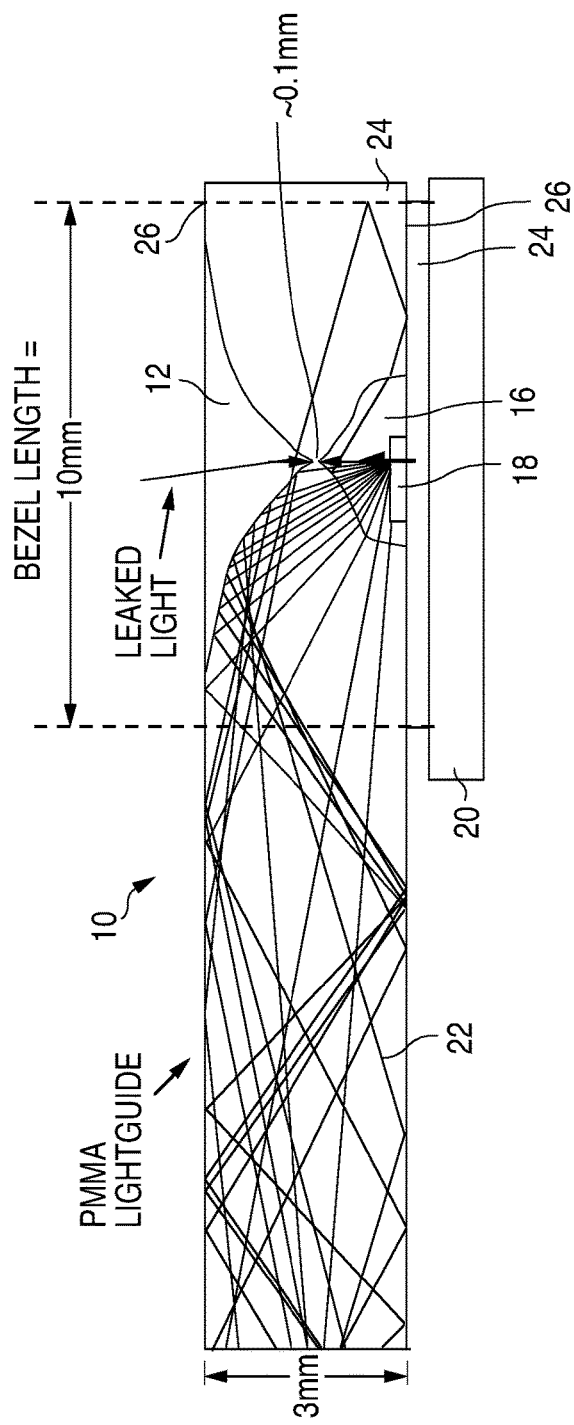
FIG. 2 is a bisected view of a single cavity and TIR structure (a cusp shape) in the light guide of FIG. 1, showing a simulation of light rays being shaped by the walls of the cavity and reflected off the TIR structure, where only a miniscule amount of light is leaked through the TIR structure.

FIG. 2 is a bisected view of only a single TIR structure 12 and its underlying cavity 16. An LED 18 is mounted on a thin printed circuit board 20 (PCB), which may be a flexible circuit, and the LED 18 is positioned in the middle of the cavity 16. All the LEDs used may be on the same PCB 20 and be aligned with all the cavities 16 for a simple fabrication process. The PCB 20 is fixed in position relative to the bottom surface of the light guide 10, such as via a frame.

In FIG. 2, the TIR structure 12 has a symmetrical circular cusp shape so that light is reflected by TIR into the light guide 10. TIR structures may also have an asymmetrical and freeform shape. FIG. 2 shows simulated light rays 22 directed by the shaped walls of the cavity 16 and the TIR structure 12 and also reflected by TIR off the smooth top and bottom surfaces of the light guide 10. In an actual embodiment, the top or bottom surface of the light guide 10 has optical features for causing the leaking out of a percentage of light across the top surface of the light guide 10. Surface optical properties of top or bottom cavity surfaces can also be tuned to control light leakage. If a diffuser sheet is used over the light guide, the emitted light will be uniform.

The LED 18 may be any type of LED, such as a GaN-based LED that emits blue light, with one or more phosphor layers that are energized by the blue light to add red and green components to create white light. Some of the blue light leaks through the phosphor. The phosphor may be a YAG phosphor (emits green-yellow light) along with a red phosphor to achieve the desired color temperature. The LED emission is generally Lambertian.

In the example of FIG. 2, the light guide 10 is 3 mm thick, and the bezel 14 is 10 mm wide.

Light reflected by TIR is essentially not attenuated, while light reflected by an opaque reflective film (such as a metalized layer) may be attenuated by about 10-15%. Therefore, using the TIR structure 12 is an improvement over using an opaque reflective layer.

The cavity 16 shape (e.g., a convex, freeform, spline or polynomial shape) is tuned to the particular TIR structure 12 used. In FIG. 2, the cavity 16 shape refracts the LED 18 light to optimally shape the LED emission for impinging on the cusp-shaped TIR structure 12 so that more LED light is uniformly intercepted by the TIR structure at above the critical angle for TIR. Therefore, the area over the TIR structure 12 may be a dark spot. The LED side light is also redirected for improved mixing in the light guide 10.

In the example, there is only a 0.1 mm gap between the top of the cavity 16 and the point of the cusp. In other embodiments there may even be no gap and the top of the cavity 16 and the point of the cusp may intersect.

Also shown in FIG. 2 is a thin reflective film 24, such as available from Toray Industries, Inc., that is laminated over the PCB 20 and vertical edges 24 of the light guide 10 to reflect light back into the light guide 10. A small air gap 26 is ideally created between the reflective film 24 and the light guide 10 to maximize TIR off the light guide 10 surfaces, which is more efficient than reflection off the reflective film 24.

In one embodiment, the TIR structures 12 and cavities 16 are circular and symmetrical. In another embodiment, the TIR structures 12 and cavities 16 are asymmetrical so as to reflect more of the LED light toward the middle of the light guide 10 and less light toward the edges. This technique can also help to shape the beam, for example asymmetric beam patterns.

In another embodiment, the TIR structures 12 and cavities 16 are shaped to leak out a controlled amount of light to blend in with the surrounding areas of the light guide 10. In such a case, no bezel 14 is needed to block dark or bright spots. However, in the example of FIG. 2, only a miniscule amount of light leaks through the point of the cusp.

Figure 3:
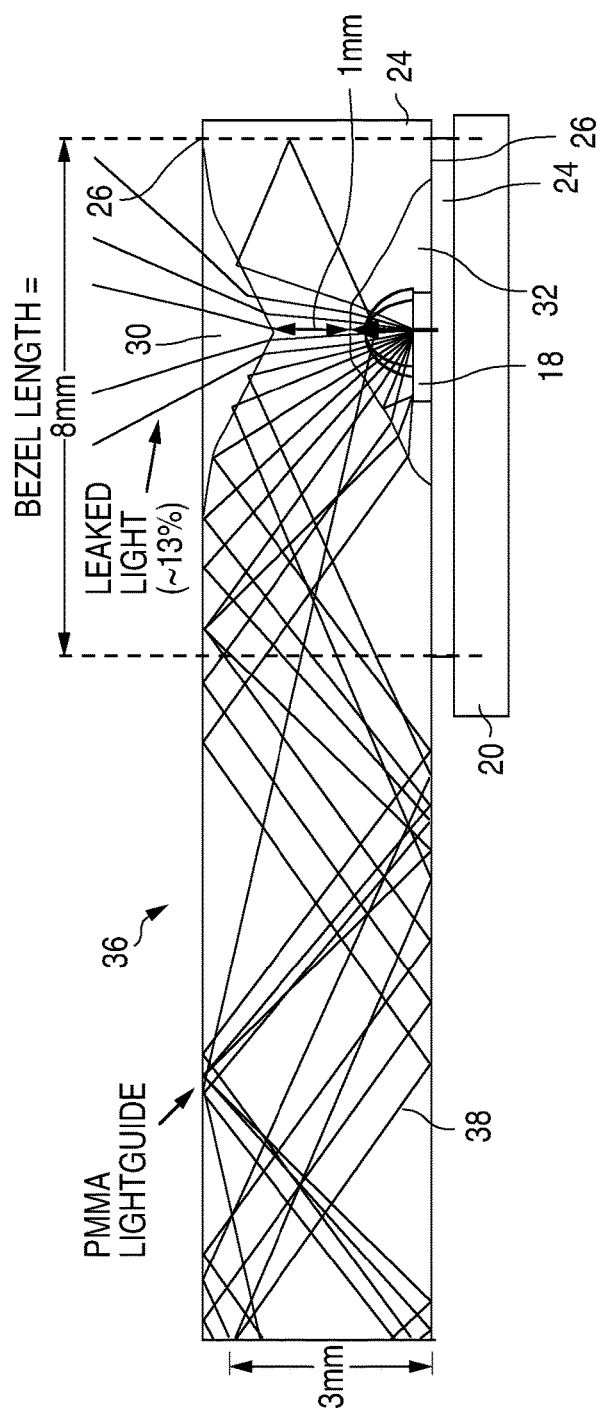
FIG. 3 is a bisected view of an alternative single cavity and TIR structure (a cone shape), showing a simulation of light rays being shaped by the walls of the cavity and reflected off the TIR structure, where a controlled percentage of light is leaked out through the TIR structure so there is no dark or bright spot above the LED.

FIG. 3 illustrates a different shape of the TIR structure 30 and cavity 32. The TIR structure 30 is essentially cone shaped, allowing more leakage due to more of the incident light being at less than the critical angle. The shape of the cavity 32 is also tuned to the TIR structure 30 to cause more of the LED light to impinge upon the TIR structure 30 at less than the critical angle. The center portion of the cavity ceiling is generally flat so more of the LED light is directed toward the center of the TIR structure 30 to escape through the TIR structure 30. A 1 mm gap is shown between the top of the cavity 32 and the TIR structure 30. The amount of light leaking through the TIR structure 30 can be made uniform across the TIR structure 30 to match the brightness of light leaking through surrounding areas of the light guide 36. In this way, no bezel is needed to hide any dark spots. Also, the LEDs may be arranged uniformly over the bottom surface of the light guide 36 rather than only along the edges. This improves uniformity and enables the fabrication of a light guide of any size. Simulated light rays 38 are shown. The remainder of FIG. 3 may be similar to FIG. 2.

FIG. 4 illustrates another cusp-shaped TIR structure 12 and an alternative shape of the cavity 40. The cavity 40 has a top ceiling shaped such that it refracts more of the LED light at less than the critical angle for the TIR structure 12 so that more LED light leaks out the TIR structure 12.

FIG. 4 also illustrates the PCB 20, which may be a flexible circuit, an insulated metal substrate, FR4, or other material. The PCB 20 has metal traces that connect the anode and cathode terminals of the LEDs to a power source. A reflective layer 42 is provided over the PCB 20. The reflective layer 42 may be a reflective solder mask. Ideally, there is an air gap between the reflective layer 42 and the bottom of the light guide 43 so more light is reflected by TIR for improved efficiency (there can be optical contact (no airgap) also for some applications). The reflector layer 42 may be white to diffuse the light, or specular, or diffusing specular.

Over the top surface of the light guide 43 is laminated a diffusing sheet 44 or other type of sheet, such as an further optical structure, for instance using a transparent adhesion layer 46. The adhesion layer 46, covering all or part of the top surface of the light guide, may for instance be glue, tape or an index matching liquid. The diffusing sheet 44 helps mix the light exiting the light guide 43 for increased uniformity. The diffusing sheet 44 may contain light scattering particles and/or have optical features or a roughened surface. Suitable diffusing sheets are available from Toray Industries, Inc. Further, by not having an air gap above the light guide surface, there is less TIR off the surface (due to the higher index of refraction of the adhesion layer 46 and diffusing sheet 44, and more light is extracted with fewer internal reflections, improving efficiency. Ideally, the adhesion layer 46 and diffusing sheet 44 have the same index as the light guide 43.

Figure 5:
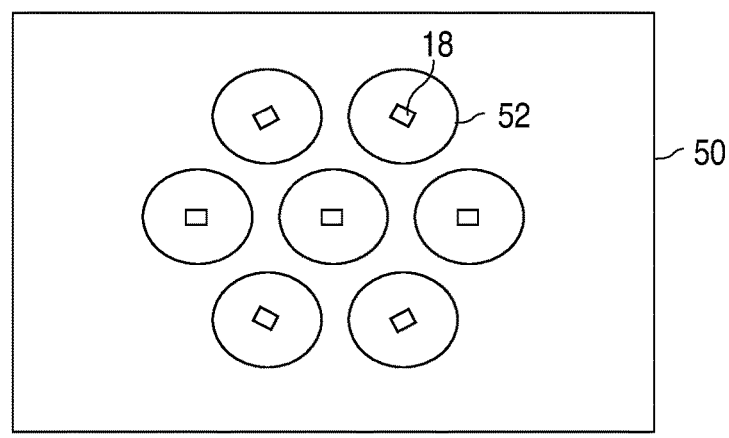
FIG. 5 illustrates how the cavities and TIR structures can be distributed over the entire area of the light guide, where the TIR structures uniformly leak out light to blend with light leaked out from surrounding areas of the light guide, enabling the creation of a light guide of any size and shape.

FIG. 5 illustrates how a light guide 50 (only a small portion is shown) may have the TIR structures 52 distributed across the light emitting surface of the light guide 50. The TIR structures 52 and underlying cavities are formed to leak out sufficient light to blend the leaked light with the light leaking out the surrounding areas of the light guide 50. Thus, a very large light guide 50 may be formed. Further, the light guide 50 may be made thinner since there is less concern about light attenuation by the light guide 50. The separation between LEDs 18 may for instance be on the order of 10 mm-100 mm, depending on the type of LED used, the desired brightness, and the size of the light guide. The relative sizes of the LEDs 18 and TIR structures 52 are greatly exaggerated for clarity.

Figure 6:
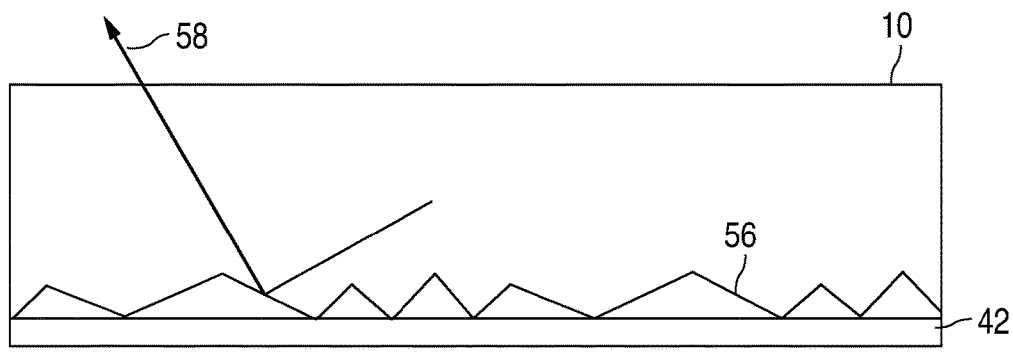
FIG. 6 illustrates optical features formed in a top or bottom surface of the light guide for leaking out light.

FIG. 6 illustrates a portion of the light guide 10 showing optical features 56 formed into the bottom of the light guide 10 to direct the light (using TIR) toward the top surface of the light guide 10 at less than the critical angle (relative to the top surface) for escaping the top surface. Multiple internal reflections are desirable to mix the light from the LEDs. A reflective film 42 is used to reflect light back into the light guide 10. A light ray 58 is shown.

The optical features 56 may vary along the surface to most uniformly cause light to leak out across the light guide.

In another embodiment, roughening the light exit surface of the light guide 10 results in the controlled leakage of light.

Accordingly, there may be five optical surfaces in the structure that direct light: the cavities, the TIR structures, the TIR of the smooth light guide surfaces, the light extraction features, and the diffusing sheet.

In one embodiment, the LED light coupling efficiency into the light guide is about 96%. The index of refraction of the PMMA light guide used in the simulations is about 1.4936.

In another embodiment, the cavities and TIR structures may be other than circular, such as square shaped. Also the light guide may have different shapes such as rectangular, square, round or any irregular/asymmetric shape.

In one embodiment, the resulting light guide provides illumination as a down light, for instance for general illumination or for horticulture application. In another embodiment, the light guide serves as a backlight for an LCD display, such as in a monitor, smart phone display, or television. Since the LEDs used in the embodiments do not require a lens, the LEDs are very thin, enabling the formation of a very thin (less than 3 mm) backlight for use in a smart phone. Other embodiments of the invention may be used for automotive applications or in photo camera flashes, for instance in smart phones. Depending on the specific applications one or more LEDs may generate light in the UV or infrared spectrum. Although the LEDs in the shown embodiments are top-emitters, within the scope of the invention also other types of LEDs may be used, such as side-emitters and n-sided emitters.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

The invention claimed is:

1. A light emitting structure, comprising:
   a light guide including a first surface and a second surface opposite the first surface, the first surface including cavities formed in the first surface, the second surface including total internal reflection structures that are aligned with the cavities, the total internal reflection structures being shaped to reflect at least some light into the light guide by total internal reflection; and
   a plurality of light-emitting diodes positioned within the cavities,
   the cavities being configured to refract light from the light-emitting diodes to impinge upon the total internal reflection structures,
   each cavity shaped to have a convex central portion opposite a center of the corresponding total internal reflection structure,
   the convex central portion being convex at its center,
   the convex central portion adjoining a side wall of the cavity at a corner that encircles the convex central portion, and
   the convex central portion facing a light-emitting diode of the plurality of light-emitting diodes that is located fully between a plane of the first surface and a plane of the second surface.

2. The structure of claim 1, further comprising a diffusing sheet overlying the second surface of the light guide.

3. The structure of claim 1, wherein a gap between the total internal reflection structures and their underlying cavities is equal to or less than 1 mm.

4. The structure of claim 1, wherein the total internal reflection structures and cavities are only located proximate to one or more edges of the light guide.

5. The structure of claim 1, wherein the light guide is a backlight for a display.

6. The structure of claim 1, wherein each total internal reflection structure and its associated cavity are separated by a portion of the light guide.

7. The structure of claim 1, wherein the light guide has light extraction features formed on the first surface.

8. The structure of claim 1, wherein the light guide has light extraction features formed on the second surface.

9. The structure of claim 1, wherein the cavities and the total internal reflection structures are formed into the light guide.

10. The structure of claim 1, further comprising:
   a diffusing sheet overlying the light guide; and
   light extraction features formed in the light guide that cause the light guide to leak light out its second surface,
   wherein light from the LEDs is directed by at least the cavities, the total internal reflection structures, total internal reflection off smooth light guide surfaces, the light extraction features, and the diffusing sheet.

11. The structure according to claim 1, wherein the total internal reflection structure is essentially cone shaped.

\* \* \* \* \*